Patented Nov. 20, 1923.

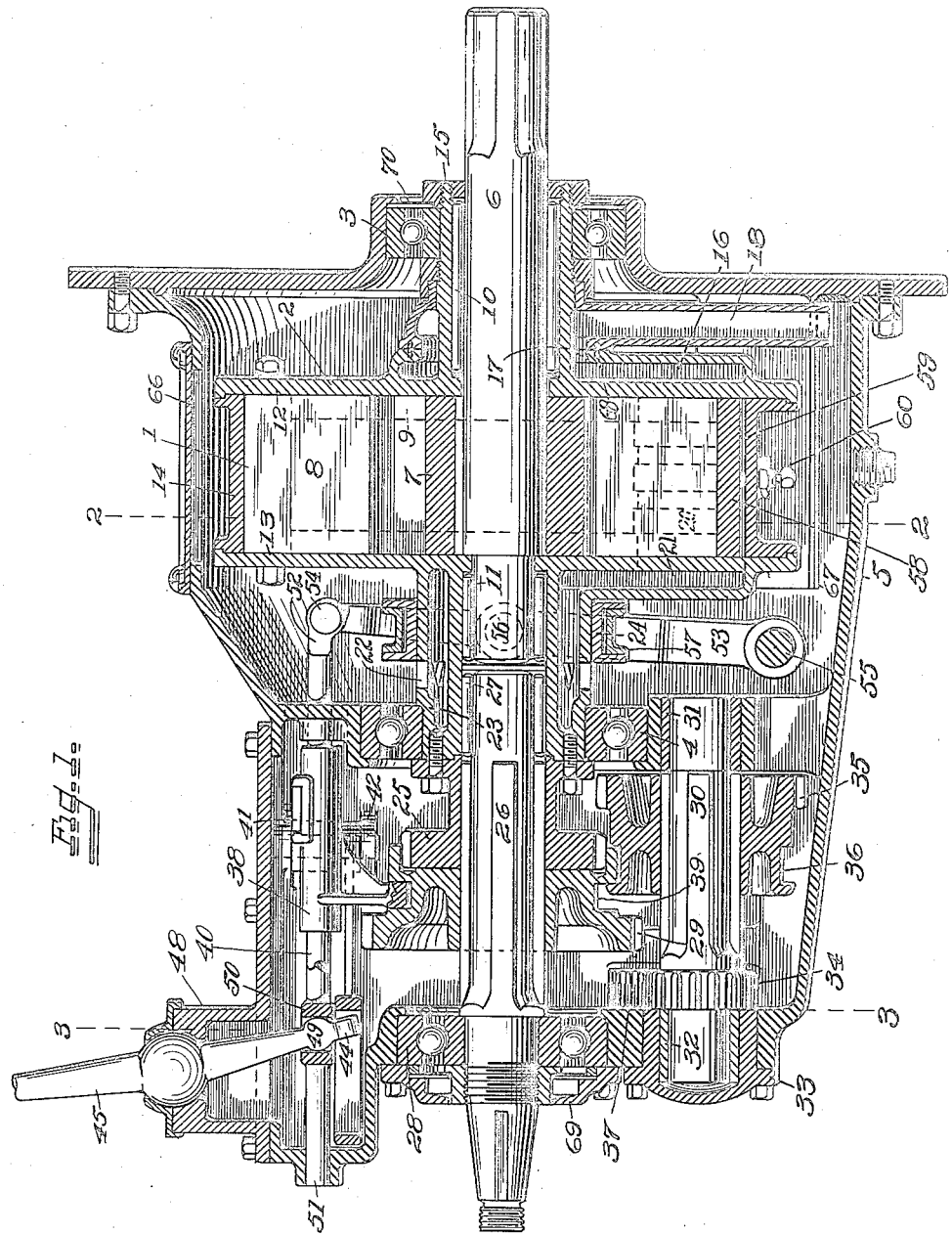

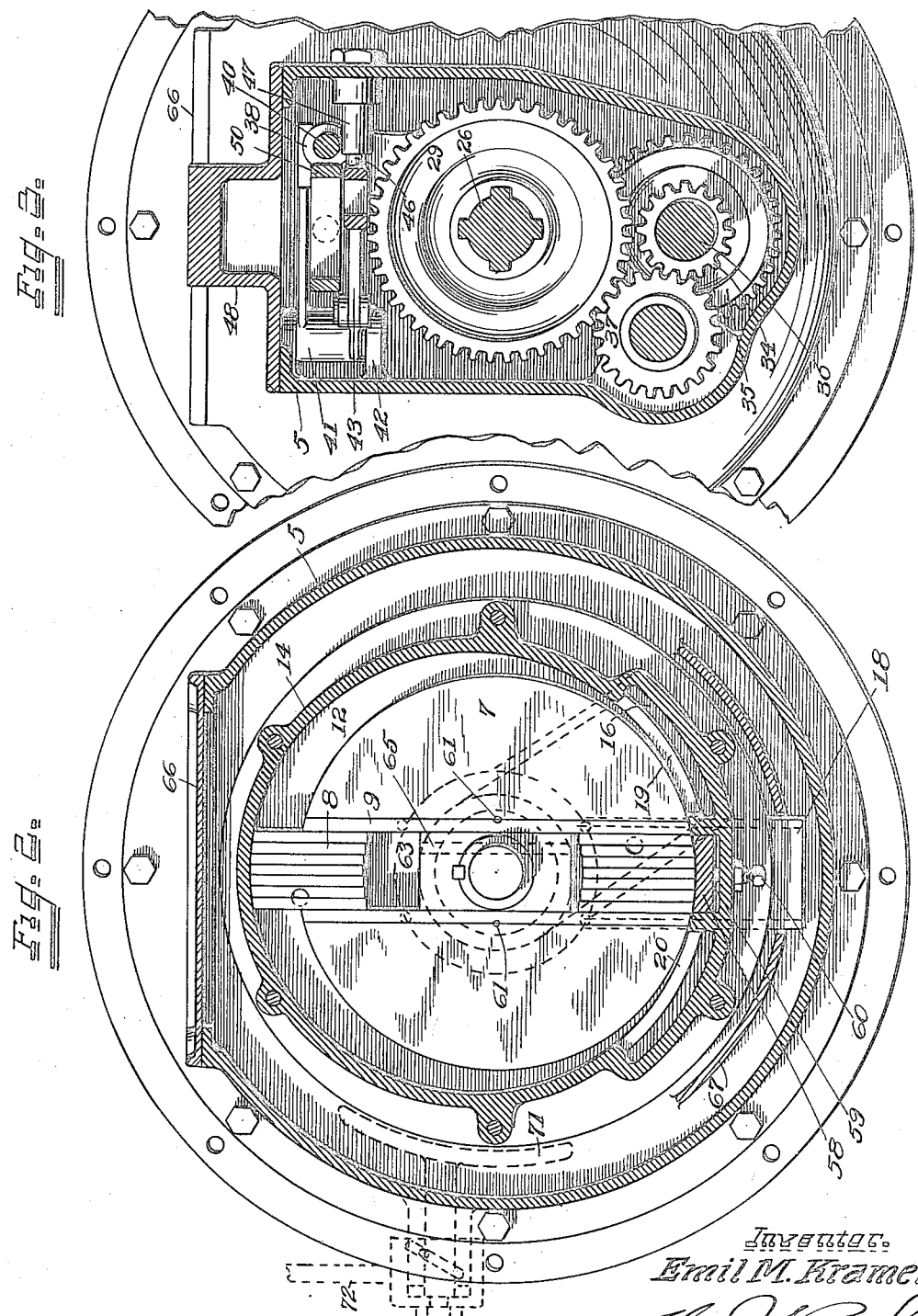

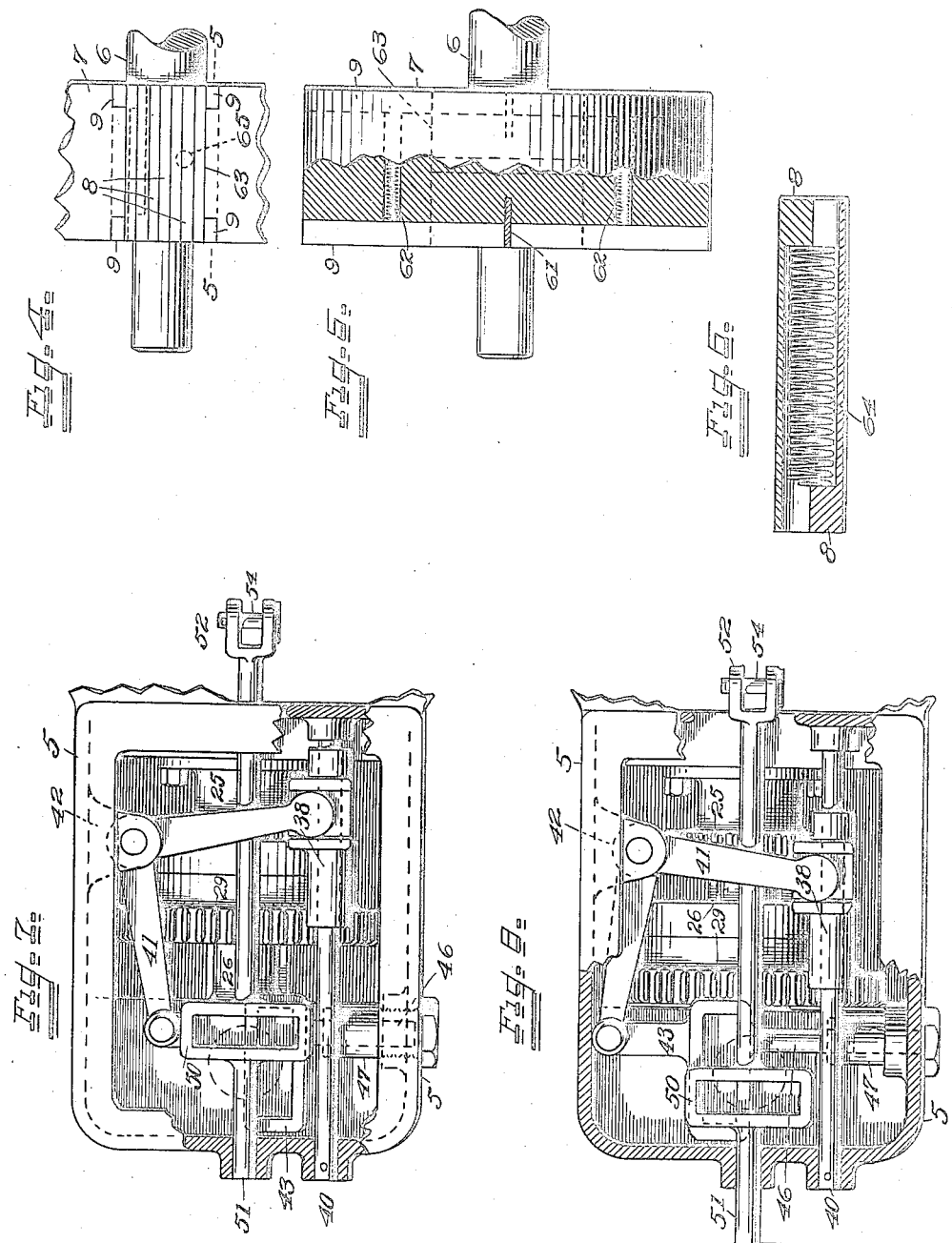

1,474,971

UNITED STATES PATENT OFFICE.

EMIL M. KRAMER, OF MORTON, ILLINOIS, ASSIGNOR TO POWER TRANSMITTING COMPANY, ORGANIZED UNDER DECLARATION OF TRUST, OF PEORIA, ILLINOIS.

TRANSMISSION.

Substitute for abandoned application Serial No. 139,040, filed December 26, 1916. This application filed April 8, 1919. Serial No. 290,106.

*To all whom it may concern:*

Be it known that I, EMIL M. KRAMER, a citizen of the United States, residing at Morton, in the county of Tazewell and State of Illinois, have invented certain new and useful Improvements in Transmissions, of which the following is a full, clear, and exact description, reference being had to the accompanying drawings, forming part of this specification.

My invention relates to transmissions intended primarily for use on automobiles and it contemplates the employment of a fluid such as oil as a medium through which the energy of the prime mover is delivered to the point of application of the power.

One object of my invention is the provision of suitable means whereby the energy of the prime mover may be applied in a gradual manner thereby providing an infinite range of speed ratios.

Another object of my invention is the provision of means whereby the fluid elements will receive the proper amount of fluid even though there be only a small quantity present in the device.

A further object of my invention is the provision of means whereby leakage of the fluid contained in the driving element will be prevented.

Other objects of my invention will appear and be described throughout the specification.

The novelty of my invention will be hereinafter more fully set forth and specifically pointed out in the claims.

In the accompanying drawings:

Fig. 1, Sheet 1, is a sectional side elevation of a transmission embodying my invention.

Fig. 2, Sheet 2, is a transverse sectional view of Fig. 1 taken on the dotted line 2—2 thereof, looking to the right.

Fig. 3, Sheet 2, is a transverse sectional view of Fig. 1 but taken on the dotted line 3—3 thereof, looking to the right.

Fig. 4, Sheet 3, is a broken plan view of the fluid moving element showing the means for preventing leakage of the fluid, the transfer port, and the vanes.

Fig. 5, Sheet 3, is a side elevation partly in section taken approximately on the dotted line 5—5 of Fig. 4.

Fig. 6, Sheet 3, is a sectional plan view of a pair of vanes showing the means by which the vanes are held outwardly against the sides of the case.

Fig. 7, Sheet 3, is a plan view of the mechanism for operating the fluid valve as well as the reverse gearing, the parts being shown in the positions they occupy in Fig. 1.

Fig. 8, Sheet 3, is a view corresponding to Fig. 7, the positions of the parts being reversed so that the fluid valve is closed and the reversing gear engaged.

The same numerals of reference are used to indicate identical parts in all the figures.

As illustrating one form of the embodiment of my invention I have shown a fluid moving element 1 mounted in a case 2 which latter is journalled as by anti-friction bearings 3 and 4 within the main case or supporting structure 5.

The fluid moving element 1 comprises the drive shaft 6, disk portion 7, vanes 8 and packing strips 9.

The shaft 6 is provided with means for attachment either to the clutch of the prime mover where a clutch is employed, or directly to the shaft or fly wheel of the prime mover, the latter being the preferable mounting, the shaft 6 being maintained in its proper position with relation to the case 2 by suitable bearings 10 and 11, which in the construction shown, are anti-friction bearings of the plain roller type.

The case 2, in the construction shown, is composed of the front plate 12, rear plate 13 and center annular section 14, the latter being formed with a bore which is eccentric to the axis of the front and rear plates 12 and 13 as clearly shown in Fig. 2, where it appears in section.

The front plate 12 of the case 2 is provided with a hub 15 within which the bearing 10 is mounted and upon which, near the outer end thereof, the bearing 3 is also mounted, this plate 12 being also provided with the admission passage 16, which passage communicate with the admission opening 17 which surrounds the hub 15. The suction element 18 is mounted upon the hub 15 its interior passage being in communication with the admission opening 17, such element being mounted so that the hub 15 may freely turn through the suction element 18, the latter extending downward to a point near the bottom of the case 5 as shown in Fig. 1 and being held against rotation by the baffle 67.

As shown in Fig. 2 the admission passage 16 communicates with the admision port 19 of the center section 14 of the case 2 and a discharge port 20, similar to the admission port 19 communicates with the discharge passage 21 of the rear plate 13, which discharge passage leads to the discharge ports 22 formed in the outer portion of the hub 23 of the plate 13, the ports 22 being adapted to be opened or closed by the valve 24, which latter is operated by mechanism to be presently described.

The bearing 11 before referred to is mounted within the inner portion of the hub 23 and the bearing 4 is mounted on the outer end of the outer portion of the hub 23.

A driving gear 25 is connected as shown to the outer end of the hub 23, and a splined driven shaft 26 passes loosely through this gear 25 and has its forward end carried by the roller bearing 27, which latter is similar to the bearing 11 and is mounted adjacent thereto, and within the inner portion of the hub 23, the rear portion of the shaft 26 being carried in the anti-friction bearings 28 which is mounted in the rear portion of the case 5, the rear end of the shaft 26 being provided with means whereby the power delivered to this shaft may be transmitted to the point of application of the power.

A combined clutch and gear 29 is splined on the shaft 26, free to slide thereon but not free to turn, the clutch portion of said clutch gear being adapted to engage the teeth of the gear 25 when brought to the position shown in Fig. 1, in which position the shaft 26 and gear 25 turn in the same direction and at the same speed.

A splined counter shaft 30 is mounted below the shaft 26, and is supported by the bearings 31 and 32, the bearing 31 being secured in the case 5, while the bearing 32 is secured in a gland 33, the cylindrical portion of the gland being of proper size to fill an opening in the case 5 large enough to permit the introduction or removal of the shaft 30 with its integral pinion 34.

A gear 35 is splined on the shaft 30, free to slide thereon but not free to turn, the gear 35 being provided with an annular recess 36 which engages the outside clutch portion of the clutch gear 29 in such manner that when the clutch gear 29 is caused to slide on the shaft 26, the gear 35 is carried thereby along the shaft 30 so that its teeth mesh with the teeth of the gear 25.

A pinion 37 is mounted within the case 5 and in mesh with the pinion 34 and, as shown in Fig. 3, at the proper center distance to be engaged by the teeth of the clutch gear 29 when the latter is in the position shown in Fig. 8, the drive then being from the gear 25 to the gear 35, shaft 30, pinion 34, idler 37, to the gear 29, and shaft 26, the rotation of the shaft 26 being in a direction reversed from the direction of rotation of the gear 25 and at a considerably slower speed.

As shown in Figs. 1, 3, 7 and 8 the mechanism for shifting the clutch 29 and the gear 35 comprises a sliding member 38 which engages the annular recess 39 of the gear 29 and which is mounted on the shaft 40, which latter is suitably mounted in the case 5 as shown in Figs. 7 and 8, and is moved along the shaft 40 through the medium of the bell crank 41 shown more clearly in Figs. 7 and 8, the bell crank 41 shown being mounted in brackets 42 extending inwardly from the side of the case 5. A sliding yoke 43 is connected to the bell crank 41 and engaged by the lower portion 44 of the operating lever 45 shown in Fig. 1, the yoke 43 being provided with stem 46 which is guided in bushing 47, screwed through the side of the case 5, the connections just described being such that when the operating lever 43 is operated sidewise, the clutch gear 29 is shifted along the shaft 26 and carries with it the gear 35 as will be readily understood.

The operating lever 45 is mounted in cover 48 in such manner that it has, in addition to the sidewise movement, a fore-and-aft movement, which movement operates the valve 24 in the following manner.

A disk-like portion 49, of the lever 45, engages a yoke 50 which is a part of the shaft 51, which latter extends forwardly and is provided at its forward end with a yoke-end 52, as shown clearly in Figs. 7 and 8. A pair of levers 53, one of which is shown in Fig. 1, are connected, through the pin 54, with the yoke-ends 52, the lower ends of the levers 53 being mounted on a shaft 55 which passes through the lower portion of the case 5 and affords a fulcrum for the operation of the levers 53. The levers 53 engage trunnions 56 extending outwardly from the ring 57 which engages with the valve 24 to slide the same upon the outer surface of the hub 23.

It will be seen from the above that when the upper end of the lever 45 is operated forwardly from the position shown in Fig. 1, the shaft 51 will be operated in a rearward direction thus operating the levers 53 and causing the valve 24 to move rearwardly over the ports 22 to close the same, while a rearward motion of the upper end of the lever 45 will restore the parts to the position shown in Fig. 1 thereby moving the valve 24 forward and opening the ports 22.

A block or shoe 58 is adjustably mounted in a pocket 59 formed in the center section 14 of the case 2 as clearly shown in Fig. 2, this block 58 being adjustable by means of the set screw and lock nut 60, in such manner that the block 58 may be set up closely against the periphery of the disk 7 to prevent leakage of fluid when pressure is applied thereto.

The packing strips 9 are inserted in channels formed in the disk 7 and are held against longitudinal motion in these channels by pins 61 as shown in Figs. 2 and 5, the packing strips 9 being passed outwardly against the end plates 12 and 13 by means of coiled springs 62 which pass thru the disk 7 and exert their outward pressure on the adjacent faces of two opposite strips 9 as will be readily understood.

The vanes 8 are mounted in pockets 63 formed in the disk 7 as shown in Fig. 2 and are preferably composed of a plurality of comparatively thin plates. In order to insure proper contact between the vanes 8 and the end plates 12 and 13, a pair of vanes in each group are provided with cavities as shown in Fig. 6 and a coiled spring 64 is mounted within these cavities in such manner that it exerts its pressure in one direction against one vane and in the opposite direction against the adjoining vane.

A transfer port 65 is provided between the two vane pockets 63 so that as the vanes in one of the pockets are forced inward, the contents of the pocket is transferred to the other pocket to force the vanes 8 outward, the pockets filling with fluid as the device is operated, this fluid gradually working into the pockets between and around the vanes.

A suitable hand hole cover 66 is provided over an opening in the case 5 thru which opening the interior parts of the mechanism may be inspected or adjusted.

To assure a supply of fluid to the suction element 18, a baffle 67, Figs. 1 and 2, extends under the case 2 and affords a reservoir within which the fluid may collect and be free from the effect of the rotation of the case 2.

To assist in supporting the suction element 18, a ring 68 may be let into the suction element and the plate 12 as shown in Fig. 1, this ring serving also as a packing between the parts to prevent leakage.

The usual form of stuffing box 69 may be employed adjacent the bearing 28 to prevent leakage of oil from the case and a similar stuffing box or a washer 70 may be employed for the same purpose at the forward end of the case adjacent the bearing 3.

In cases where it is desired to employ the device in a construction in which the usual form of clutch is omitted it may be found advisable to supply the transmission with some form of brake mechanism to arrest the rotation of the case 2, and to this end I have shown a shoe 71, Fig. 2, which may be mounted adjacent the outer diameter of the case 2 and adapted to be brought into contact therewith through the lever 72, the upper end of which may be provided with means for operation by either hand or foot.

The operation of the device is as follows:

When the parts are in the position shown in Fig. 1 the device is in such condition that should the shaft 6 and its associated parts be rotated the vanes 8 co-acting with the eccentric annular section 14 of the case 2 will induce a flow of fluid from the lower portion of the case 5 upward through the suction member 18, thence through the admission opening 17, admission passage 16, admission port 19, into the cavity between the disk 7 and section 14, thence around the disc 7, being carried by the vanes 8 through the crescent shaped space between the section 14 and the disc 7, thence outward through the discharge port 20, discharge passage 21, and discharge ports 22 and so into the case 5 whereupon the fluid will find its way to the bottom of the case to be again circulated as above described and any heat imparted to the fluid may be dispersed by radiation from the case.

To impart motion to the shaft 26 it is necessary that the valve 24 be partly closed whereupon resistance will be interposed within the circuit of the flow of the fluid, this resistance depending upon the amount of closure of the ports 22, and this resistance will cause the case 2 to revolve on its bearings at a speed proportionate to the speed of rotation of the shaft 6 and the amount by which the area of the ports 22 is reduced by the valve 24.

By still further moving the valve 24 over the ports 22 the resistance to the flow of the fluid will be increased and the rotation of the case 2 will be correspondingly increased and when the valve 24 entirely closes the ports 22 no fluid can pass through the device and it will be consequently locked as far as rotation between the case 2 and the shaft 6 is concerned, this last described condition corresponding to the usual high speed position of the gears in an ordinary transmission.

A reversal of the motion of the valve 24 will gradually uncover the ports 22, thereby permitting the fluid to pass from the interior of the case 2 which will result in reducing the speed of the case 2 as will be readily understood.

To produce the result just described the upper end of the lever 45 is carried in a forward direction or toward the large diameter of the case 5, the disk-like portion 49 of this lever engaging the yoke 50 of the rod 51, the latter through its connections operating the valve 24 as before described.

Should it be desired to operate the shaft 26 in a reverse direction, the upper end of the lever 45 is operated sidewise, the disk-like portion 44 thereof by its engagement with the yoke 43 shifts the latter from the position shown in Fig. 7 to that shown in Fig. 8, the yoke 50 and rod 51 remaining in the position shown in Figs. 1 and 7. The sidewise shifting of the yoke 43 rocks the bell crank 41, which latter through its engagement with the sliding member 38 shifts the clutch gear 29 from the position shown in Fig. 7 to that shown in Fig. 8 thereby bringing the gear 35 into engagement with the gear 25 and the gear 29 into engagement with the gear 37 whereupon the operator then moves the upper end of the lever 45 forward as before, the disk-like portion 49 thereof through its engagement with the yoke 50, moving the valve 24 over the ports 22 whereupon the energy delivered to the gear 25 is transmitted to the shaft 26 in a reverse direction as will be readily understood.

It will be seen from the above that I have produced a device which may be adapted to the usual or any suitable form of prime mover and connected to any mechanism which it is desired to operate and in which an indefinite number of speed ratios are obtainable and in which the final operation may be in either direction. It will be further observed that by the arrangement of the parts described a single lever may be employed for accomplishing the operation of the various elements of the device.

Having thus fully described my invention, I claim:

1. In a transmission the combination of a housing, a baffle in the lower portion thereof, a case revolubly mounted in said housing above said baffle, a fluid moving element within said case, an inlet passage in said case, an outlet passage from said case, a valve for controlling said outlet passage, and a suction element extending from the inlet passage of said case to a point below said baffle.

2. In a transmission the combination of a housing, a baffle in the lower portion thereof, a case journaled within said housing and provided with extended hubs, an annular inlet passage surrounding one of the hubs of said case and extending to a point near the periphery thereof, an outlet passage extending from a point near the periphery of said case to the other of the hubs thereof, outlet ports in the hub of said case on the outlet side thereof, ports in the hub of said case on the outlet, a valve for said ports, for operating said valve, a suction element surrounding the inlet passage hub of said case and communicating with the inlet passage and expanding to a point below said baffle.

EMIL M. KRAMER.